United States Patent
Hay et al.

(10) Patent No.: US 8,501,896 B2
(45) Date of Patent: Aug. 6, 2013

(54) HIGH TEMPERATURE POLY(ARYL ETHER)S CONTAINING A PHTHALAZINONE MOIETY

(75) Inventors: Allan S. Hay, Montreal (CA); Xigao Jian, Dalian (CN); Yi-Feng Wang, Clifton Park, NY (US)

(73) Assignee: HT Materials Corporation, Clifton Park, NY (US)

( * ) Notice: Subject to any disclaimer, the term of this patent is extended or adjusted under 35 U.S.C. 154(b) by 0 days.

(21) Appl. No.: 12/680,510

(22) PCT Filed: Sep. 26, 2007
(Under 37 CFR 1.47)

(86) PCT No.: PCT/CA2007/001736
§ 371 (c)(1),
(2), (4) Date: Mar. 26, 2010

(87) PCT Pub. No.: WO2009/039606
PCT Pub. Date: Apr. 2, 2009

(65) Prior Publication Data
US 2011/0166317 A1    Jul. 7, 2011

(51) Int. Cl.
*C08G 8/02* (2006.01)
(52) U.S. Cl.
USPC .............................. 528/128; 528/86; 528/125
(58) Field of Classification Search
USPC ................................... 528/128, 86, 210, 125
See application file for complete search history.

(56) References Cited

U.S. PATENT DOCUMENTS

| 4,108,837 A | 8/1978 | Johnson et al. |
| 4,175,175 A | 11/1979 | Johnson et al. |
| 5,237,062 A | 8/1993 | Hay |
| 5,254,663 A | 10/1993 | Hay |
| 6,228,970 B1 | 5/2001 | Savariar |
| 6,828,414 B2 | 12/2004 | Okamoto et al. |

FOREIGN PATENT DOCUMENTS

CN    93109180.2  P    7/1996

OTHER PUBLICATIONS

Berard, N. and A.S. Hay, Polymers from Hydroxyphenyl-phthalazinones, in Polym. Prepr. (Am. Chem. Soc. Div. Pol. Chem.) 1993.
Berard, N. et al, Polymers from 4-(4-Hydroxyphenyl)phthalazin-1-one, Makromolekulare Chemie, Macromol. Symp., 1994, 77: p. 379-88.
Meng, Y. et al, Study on the thermo-oxidizing stability of poly(aryl ether ketone) containing phthalazone moiety, Gaofenzi Cailiao Kexue Yu Gongcheng, 1994, 10(6): p. 85-8.
Meng, Y. et al, Synthesis and Testing of a New Poly(ether ketone), Gaofenzi Caiilo Kexue Yu Gongchen (CA 121,301481s), 1994, 10(20): p. 22-5.
Paventi, M. et al, Spectroscopic and Magnetic Resonance Elucidation of the Structure of the Polymer . . . , J. Macromol. Sci., 1996, A32: p. 133-56.
Meng, Y.Z. et al, Synthesis of Novel Poly(phthalazinone ether sulfone ketone)s and improvement of its Melt Flow Properties, J. Appl. Pol. Sci., 1997, 66: p. 1425-33.
Meng, Y.Z. et al, Synthesis and Properties of Poly(aryl ether sulfone)s Containing the Phthalazinone Moiety, J. Appl. Pol. Sci., 1998, 68: p. 137-45.
Meng, Y.Z. et al, Morphology, rheological and thermal properties of the melt blends of poly(phthalazinone ether ketone sulfone) . . . , Polymer, 1998, 39: p. 1845-61.
Meng, Y.Z. et al, Synthesis and Thermal Properties of Poly(arylene ether ketone)s Containing Phthalazinone Moieties, J. Pol. Sci. Chem., 1999, 37: p. 1781-8.
Savariar, S. et al, Polysulfone with lower levels of cyclic dimer: Use of MALDI-TOF in the study of cyclic oligomers, Presented at ICOM, Toulouse, France, Jul. 7-12, 2002, p. 15-20.

Primary Examiner — Shane Fang
(74) Attorney, Agent, or Firm — GFD Patents LLC; Gerald F. Dudding

(57) ABSTRACT

A poly(phthalazinone sulfone) composition for molded articles having such characteristics as high temperature resistance, good electrical properties, good chemical and solvent resistance and toughness consists essentially of a polymer of formula (I):

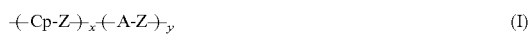

wherein Z is a bisphenyl sulfone moiety of formula: (II):

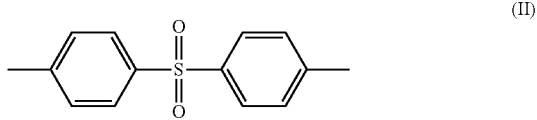

A is a phthalazinone moiety of formula (III):

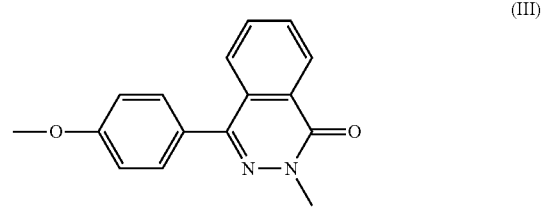

Cp is A, as defined above, or a biphenol moiety of formula (IV):

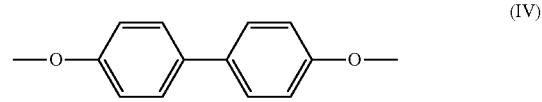

x is an integer of at least 1;
y is an integer of at least 1; and x+y=n, where n is an integer such that the polymer has a weight average molecular weight of about 20,000 to about 170,000, the composition comprising less than 5%, by weight, of low molecular weight oligomers; and having a glass transition temperature (Tg) from 225 to 305° C.

20 Claims, 2 Drawing Sheets

HIGH TEMPERATURE POLY(ARYL ETHER)S CONTAINING A PHTHALAZINONE MOIETY

TECHNICAL FIELD

This invention relates to a new poly(phthalazinone ether sulfone) composition and a process for its manufacture, and to articles molded of the composition.

BACKGROUND ART

Aromatic polyethers are important engineering resins because of their excellent properties such as high temperature resistance, good electrical properties, good chemical and solvent resistance and toughness.

Poly(aryl ether)s with high heat resistance, low level of cyclic oligomers, and narrow polydispersivity are highly desirable for manufacturing of molded articles for demanding automotive, aerospace and electronics applications.

One route to the synthesis of these polymers is by the reaction of salts of dihydroxyaromatic compounds, such as bisphenol A, with activated dihaloaromatic molecules. One commercially available group of poly(aryl ether sulfone)s, available from Solvay Advanced Polymers LLC, under the trade-mark Radel®, are those containing a biphenyl moiety, typically derived from 4,4'-biphenol. Poly(aryl ether sulfone)s are conventionally made by the nucleophilic polycondensation of 4,4'-biphenol with bis(4-chlorophenyl)sulfone as described, for example, in U.S. Pat. Nos. 4,108,837, 4,175,175, and 6,228,970. Due to their excellent mechanical and other properties, poly(biphenyl ether sulfone)s can be used to manufacture a variety of useful articles such as molded articles, films, sheets and fibers. However, the glass transition temperature ($T_g$) of the poly(biphenyl ether sulfone) is 220° C., and cannot be used in applications where heat resistance of greater than 220° C. is required.

U.S. Pat. No. 5,254,663 teaches a new class of poly(aryl ether)s containing the phthalazinone moiety. This new class of polymers has also been described extensively in the literature [1-9]. Poly(aryl ether sulfone) containing the phthalazinone moiety, also called poly(phthalazinone ether sulfone), has the structure 1 and has a glass transition temperature ($T_g$) of about 305° C., is suitably made by the nucleophilic polycondensation of 4(4-hydroxyphenyl)-1(2H)-phthalazinone (called phthalazinone monomer or DHPZ herein and having the structure 2) with bis(4-chlorophenyl)sulfone in a polar solvent in the presence of potassium carbonate.

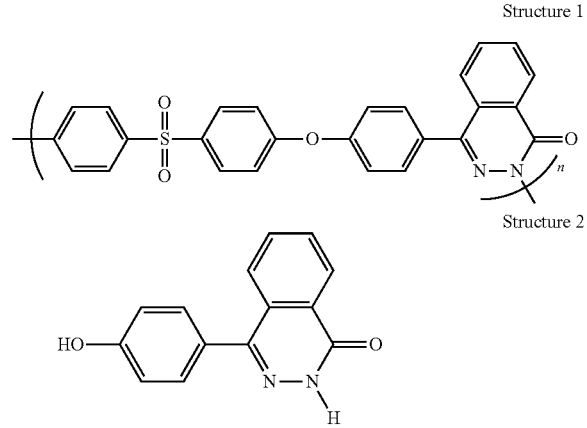

Structure 1

Structure 2

The poly(phthalazinone ether sulfone)s produced contain a high level of cyclic oligomers, typically 12-18%, by weight, and have very high polydispersivity, typically 10 to 16. A high level of cyclic oligomers has adverse effects on the properties of the resulting polymers. Such negative effects can include a lower $T_g$, reduced solubility in solvents, and reduced ductility. The high levels of cyclic oligomers have to be removed by tedious steps of re-precipitation in order to produce useful products. In addition, the cyclic by-products must be discarded after separation, increasing the cost and size of the waste stream and reducing the efficiency of the process.

Poly(phthalazinone ether sulfone)s are high Tg amorphous polymers and offer potential as high temperature resistance resins. Poly(phthalazinone ether sulfone)s can be prepared via the nucleophilic polycondensation reaction of the phthalazinone-containing monomer 4-(4-hydroxyphenyl)phthalazin-1(2H)-one with activated dihaloaromatic molecules. Due to the unique chemical structure of the phthalazinone moiety, it is prone to formation of a high level of cyclic oligomers during the nucleophilic polycondensation reaction. These low molecular weight cyclic oligomers have negative effects on properties and are undesirable. In addition, due to extremely high melt viscosity, the existing material cannot be processed using conventional melt processes such as extrusion and injection molding.

The homopolymer prepared from DHPZ and bis(4-chlorophenyl)sulphone has a very high Tg, about 305° C., and cannot be melt processed since at the very high temperatures that would be required, significant degradation would occur. Meng, Hay et al attempted to improve the melt processability of poly(phthalazinone ether sulfone) through copolymerization with 4,4'-difluorobenzophenone to make poly(phthalazinone ether sulfone ketone) (PPESK) [6, 8]. The ketone homopolymer has a Tg of about 265° C. and therefore the ketone/sulfone copolymers have Tg values between the Tg of the two homopolymers, i.e., 265° C. to 305° C. However, these polymers were also not melt processable because of their high melt viscosities. The melt viscosity of poly(phthalazinone ether sulfone ketone) with a relatively low molecular weight (inherent viscosity of 0.29 dL/g) is still very high and it cannot be used for injection molding [6]. In order to have injection moldable resins, the copolymer had to be blended with low molecular weight oligomers of poly(aryl ether sulfone) or poly(phthalazinone ether sulfone) [6]; or to be blended with liquid crystal polyester (LCP) that resulted in an immiscible blend [8]. Since the LCP is immiscible, these blends are not transparent, and the Tgs of the blends still show the PPESK glass transition, although it is slightly lowered.

Another approach that was studied was the preparation of copolymers with hydroquinone (PAES 1), bisphenol-A (BPA) (PAES2), and bis(4-hydroxyphenyl) sulfone (PAES 3) [7]. These polymers were synthesized in order to lower the melt viscosity so that the polymers could be potentially melt processed. A PAES 3 polymer containing 65% DHPZ has a high Tg but also a very high melt viscosity that makes it unprocessable. PAES 2 with contents as high as 80% DHPZ have improved melt viscosities; however, the Tg is only 258° C. at 80% DHPZ. The PAE 1 polymers would not be expected to have high temperature capabilities and a 50:50 copolymer had a Tg of 242° C. Copolymerization with hydroquinone, BPA or bis(4-hydroxyphenyl)sulfone can produce copoly(phthalazinone ether sulfone)s with reduced melt viscosity; however, a copoly(phthalazinone ether sulfone) with phthalazinone as minor component (e.g. 25 mol %) still has very high melt viscosity (~$10^5$ Pa·s), and materials with good mechanical properties from these copolymers were only obtained from samples prepared via solution casting [7].

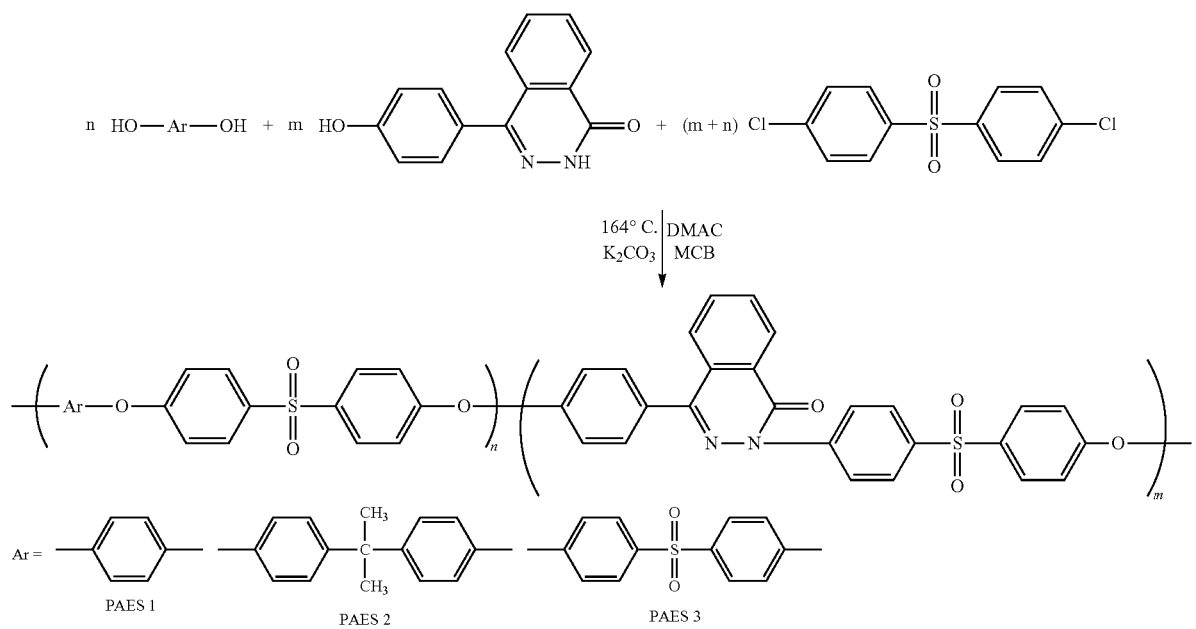

SUMMARY OF THE INVENTION

It has been determined, in accordance with the invention, that poly(phthalazinone ether sulfone)s, including both their homopolymers and copolymers, can be prepared with improved polydispersivity, low level of cyclic oligomers, and can be processed via melt processes such as extrusion and injection molding.

It is an object of the invention to provide poly(phthalazinone ether sulfone)s having reduced level of cyclic oligomers, and narrow polydispersivity.

It is another object of the invention to provide poly(phthalazinone ether sulfone)s having glass transition temperatures (Tg) from 225 to 305° C.

It is yet another object of the invention to provide poly (phthalzinone ether sulfone)s having less than 5%, by weight, oligomers, particularly cyclic oligomers.

It is yet another object of the invention to provide poly (phthalzinone ether sulfone)s having less than 3.5%, by weight of low molecular weight oligomers, particularly cyclic oligomers.

It is still another object of the invention to provide poly (phthalazinone ether sulfone)s having Mw from 20,000 to 170,000.

It is a further object of the invention to provide poly(phthalazinone ether sulfone)s having polydispersivity of less than 6.

Still another object of the invention is to provide poly (phthalazinone ether sulfone)s that can be processed via extrusion and injection molding.

In one aspect of the invention, there is provided a poly (phthalazinone sulfone) composition consisting essentially of polymer of formula (I):

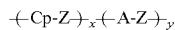

wherein Z is a diphenylsulfone moiety of formula: (II):

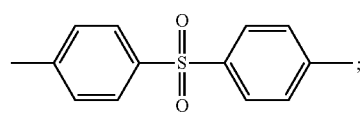

A is a phthalazinone moiety of formula (III):

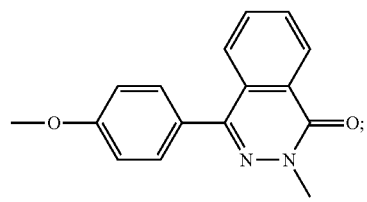

Cp is A, as defined above, or a biphenol moiety of formula (IV):

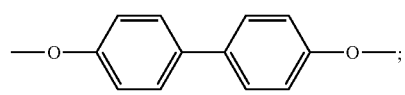

x is an integer of at least 1;
y is an integer of at least 1; and
x+y=n, where n is an integer such that the polymer has a weight average molecular weight of about 20,000 to about 170,000, the composition comprising less than 5%, by weight, of low molecular weight oligomers; and having a glass transition temperature (Tg) from 225 to 305° C.

In another aspect of the invention, there is provided a process for preparing a poly(phthalazinone sulfone) composition consisting essentially of polymer of formula (I), as defined above, comprising: polymerizing a bis(halophenyl) sulphone of formula (V):

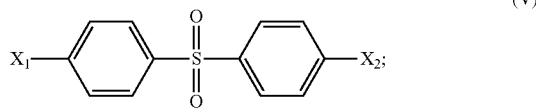

wherein $X_1$ and $X_2$ are independently selected from halogen atoms, with a 4(4-hydroxyphenyl)-1(2H)-phthalazinone, and optionally a bisphenol, in a reaction medium comprising a solvent and an alkali metal or alkaline earth metal carbonate or bicarbonate, at an elevated temperature, while maintaining said reaction medium substantially anhydrous by removal of water generated in the polymerization.

In another aspect of the invention, there is provided a molded article of the composition of the invention.

DETAILED DESCRIPTION OF THE PREFERRED EMBODIMENTS

It would be desirable to have a poly(phthalazinone sulfone) that contains significantly lower amounts of cyclic oligomers and much narrower polydispersivity. In addition, since the melt viscosities are too high for melt processing of the materials, the poly(phthalazinone ether sulfone)s can only be used to produce articles such as film via solution casting. It is highly desirable to have poly(phthalazinone ether sulfone)s with glass transition temperatures (Tgs) above 260° C. that can be used to manufacture article, films, sheets and fibers via melt processing such as extrusion, injection molding and blow molding.

This invention provides for such improved poly(phthalazinone ether sulfone)s. The poly(phthalazinone ether sulfone)s of this invention have improved polydispersivity, very low level of undesirable low molecular weight cyclic oligomers, and have improved melt flow properties. The improved melt flow properties allow poly(phthalazinone ether sulfone)s to be melt processed via extrusion, injection molding, etc. The poly(phthalazinone ether sulfone)s of this invention have properties which make them superior for manufacturing high temperature resistant molded and other articles of manufacture.

Manufacture

Although the improved poly(phthalazinone ether sulfone)s of this invention are not limited by the manner in which the poly(phthalazinone)s are prepared, it has been determined that poly(phthalazinone ether sulfone)s having improved polydispersivity and reduced level of cyclic oligomers can be prepared by adjusting the concentration of the monomer reactants (also called solid content) in a solution polymerization reaction for making the poly(phthalazinone ether sulfone)s. By conducting the solution polymerization reaction at ultra high concentrations followed by slow reduction of reactant concentrations via continuous addition of solvents, thereby forming a final polymerization reaction mixture with high polymer solids content, the improved poly(phthalazinone ether sulfone)s of this invention are obtained.

Furthermore, the incorporation of a bisphenol monomer such as 4,4'-biphenol, in the polymer, is surprisingly found to further reduce the level of cyclic oligomers and improve the polydispersivity of the poly(phthalazinone ether sulfone)s.

It has been determined that the Tgs of the poly(phthalazinone ether sulfone)s can be adjusted by varying the level of incorporation of the 4,4'-biphenol monomer and that high Tg copolymers are readily obtained.

It has also been determined that the melt flow properties of these modified poly(phthalazinone ether sulfone)s can be greatly improved with controlled molecular weight, improved polydispersivity and low levels of cyclic oligomers.

The process of producing the poly(phthalazinone ether sulfone)s comprises reacting the monomer in a solution polymerization reaction at relatively high concentrations in the solution, at an elevated temperature, while removing water such that the solution is substantially anhydrous.

The reaction is carried out in the presence of an alkali metal carbonate or bicarbonate, for example, sodium carbonate or potassium carbonate.

Typically, the polymerization reaction is carried out at a temperature of 150° C. to 250° C., especially 170° C. to 220° C.

The reaction is carried out at a high concentration of the monomer reactants in the reaction medium, typically at least 50% and preferably 60 to 70% by weight based on the weight of the reactants and the reaction medium.

Water is generated during the polymerization and is conveniently removed by employing a solvent which forms an azeotrope with water, whereby distillation of the solvent from the reaction mixture removes the water generated in the polymerization. Suitable solvents which form an azeotrope with water are aromatic hydrocarbons, for example, benzene, toluene, xylene, ethylbenzene and chlorobenzene.

In order to avoid formation of too viscous a reaction solution as the polymerization proceeds a polar, aprotic solvent is added, preferably on a continual or continuous basis, to maintain the solution viscosity at a level that allows the reaction mixture to be readily stirred. The polar, aprotic solvents are known in the field of poly(aryl ether sulfone) manufacture and includes: dimethylsulfoxide, dimethylsulfone, diphenylsulfone, diisopropylsulfone, tetrahydrothiophene-1,1-dioxide (commonly called tetramethylene sulfone or sulfolane. Additionally, nitrogen containing solvents may be used. These include N,N-dimethylacetamide, N,N-dimethylformamide and N-methyl-pyrrolidinone. The azeotrope forming solvent and polar aprotic solvent are used typically in a weight ratio of from about 1:10 to about 5:1, preferably from about 1:5 to about 5:1. In the reaction, the hydroxy containing compound, more especially the 4(4-hydroxyphenyl)-1(2H)-phthalazinone, and the 4,4'-biphenol comonomer, when present, is slowly converted, in situ, to the alkali or alkaline earth metal salt thereof by reacting with the alkali metal or alkaline earth metal carbonate or bicarbonate. It is preferred to employ an alkali metal carbonate and the alkali metal carbonate is preferably potassium carbonate; however, mixtures of carbonates such as potassium and sodium carbonate may also be used. Water is continuously removed from the reaction mixture as an azeotrope with the azeotrope forming solvent so that substantially anhydrous conditions are maintained during the solution polymerization.

In this method it is important that the reaction medium be maintained substantially anhydrous during the solution polymerization, which involves polycondensation. While amounts of water up to about one percent can be tolerated, amounts of water substantially greater than this are desirably avoided as the reaction of water with halo compounds among the monomer reactants leads to formation of phenolic species and only low molecular weight products are obtained.

Maintaining a substantially anhydrous reaction solution along with maintaining a high solids content produces high molecular weight polymers, and a low content of low molecular weight cyclic oligomers. Desirably the reaction solution should contain less than 0.5 percent by weight water during the reaction.

In the preferred procedure, the azeotrope-forming solvent, for example, xylene, is removed from the reaction mixture, such as by distillation, after the water formed in the reaction is removed leaving the poly(phthalazinone sulfone) composition formed dissolved in the polar aprotic solvent, and any remaining non-distilled azeotrope-forming solvent.

The polymerization may be terminated with an activated aromatic halide or an aliphatic halide, for example, methyl chloride or benzyl chloride, when a desired molecular weight has been attained. Such treatment of the polymer converts the terminal hydroxyl groups into ether groups which stabilize the polymer.

Preferably, the weight average molecular weight Mw of the poly(phthalazinone ether sulfone)s of this invention is in the range of about 20,000 to about 170,000, more preferably about 25,000 to about 100,000. The number average molecular weight Mn of the poly(phthalazinone ether sulfone)s of this invention is such that the poly(phthalazinone ether sulfone)s have a relatively low polydispersivity (i.e., Mw/Mn), and more particularly a polydispersivity of less than 6, more especially less than 3.

Higher amounts of low molecular weight oligomers, including cyclic oligomers, lowers the number average molecular weight whereas the weight average molecular weight is less affected. Thus, where the level of low molecular weight oligomers is increased, the polydispersivity is increased. The low molecular weight oligomers in the poly (phthalazinone ether sulfone)s of this invention typically have a molecular weight of not more than 4000, more preferably not more than 2000, and are present in an amount of less than 5%, by weight, more especially less than 3%, and preferably less than 2%, by weight of the polymer. These low molecular weight oligomers will typically be cyclic oligomers.

The poly(phthalazinone ether sulfone)s of this invention have glass transition temperatures (Tg) from 225 to 305° C., preferably 260 to 300° C.

It will be understood that the poly(phthalazinone ether sulfone) copolymer compositions of the invention will have a random distribution of the comonomers in the polymer chains and being free of or having a low content of low molecular weight oligomers, especially cyclic oligomers.

DETAILED DESCRIPTION WITH REFERENCE TO THE DRAWINGS

Figure 1:
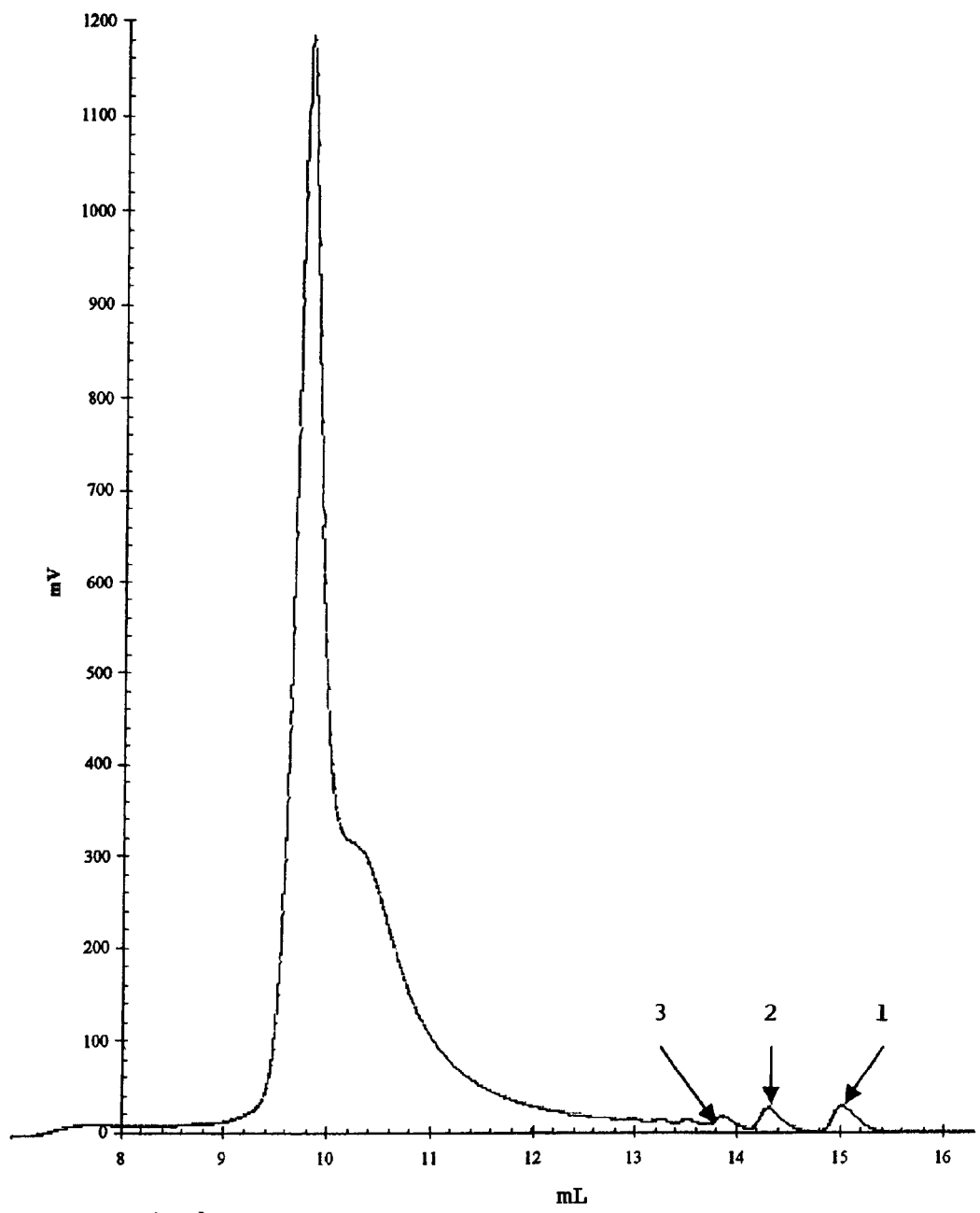
FIG. 1 is a plot showing a typical chromatogram of poly (phthalazinone ether sulfone)s of the invention, illustrating the narrow polymer dispesivity and the low level of low molecular weight cyclic oligomers.

The cyclic nature of the low molecular weight oligomers in poly(phthalazinone ether sulfone)s were confirmed by MALDI-TOF analyses. The oligomer content of the poly (phthalazinone ether sulfone)s was determined by high pressure liquid chromatography (HPLC) using a mixture of isopropanol (3 vol %) and methylene chloride (97 vol %) as the mobile phase and an ultraviolet (UV) detector at 254 nanometers. The column used was 150×4.6 mm Zorbax Eclispe XDB-C8 reverse phase column at 40° C., available from Agilent Technologies. A flow rate 1.0 ml/minute of the isopropanol/methylene chloride mobile phase was used. The cyclic oligomeric materials reported here are the three major, substantially resolved peaks that elute after poly(phthalazinone ether sulfone)s. FIG. 1 shows a typical HPLC chromatogram of poly(phthalazinone ether sulfone)s. Cyclic oligomers are identified as 1, 2 and 3 in the chromatogram of mV against elution volume (ml). In calculating the weight percent of cyclic oligomers, it was assumed that the UV detector response factor based on weight of the material eluted was the same for the cyclic oligomers and the poly(phthalazinone ether sulfone) polymer. When calculating the areas of peaks of the oligomer, the computer software program was used to calculate the areas, and was set to force a line from the valleys between peaks and perpendicular to the base line.

Figure 2:
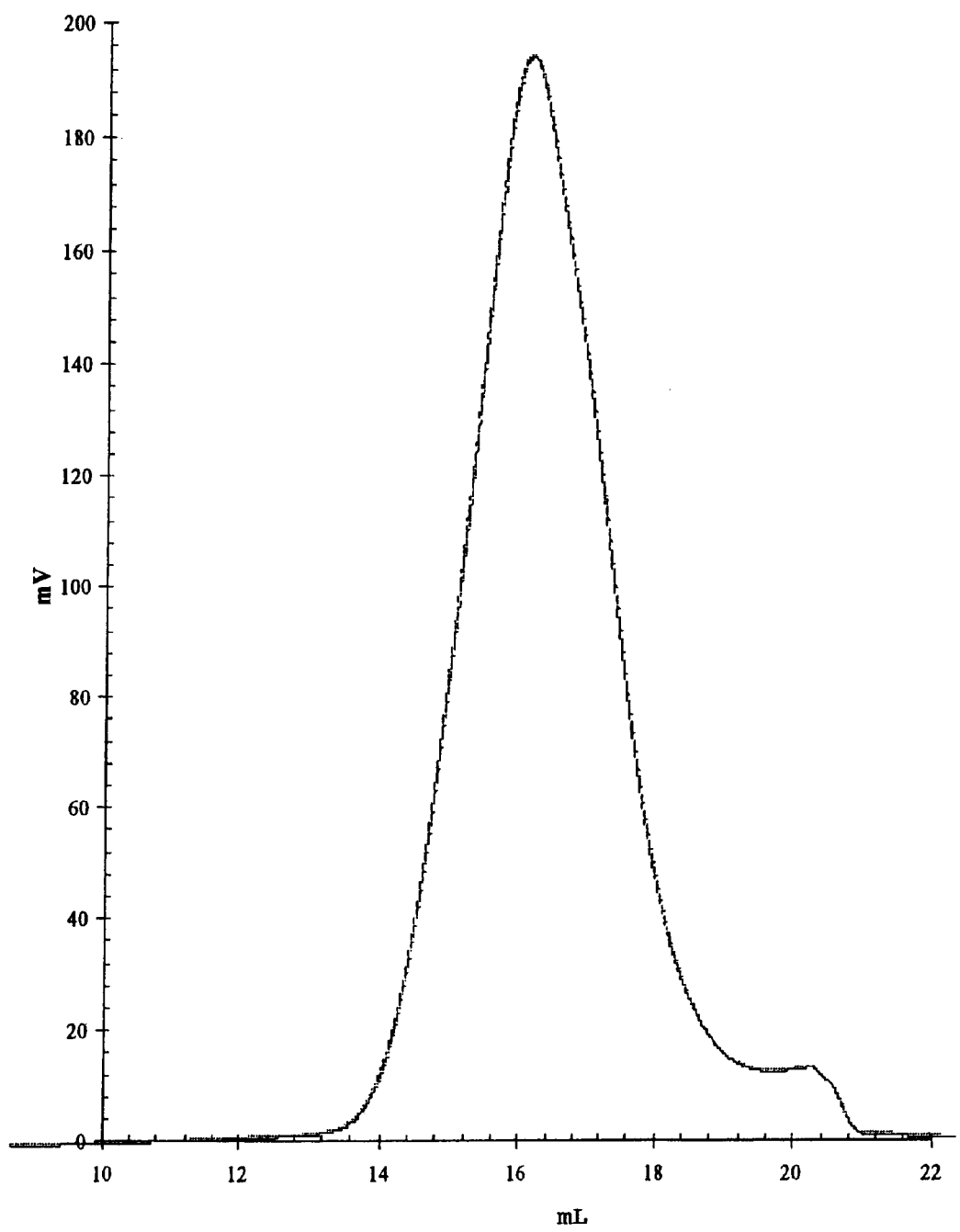
FIG. 2 shows a typical SEC chromatogram of poly(phthalazinone ether sulfone)s of the invention.

The Mn and Mw of poly(phthalazinone ether sulfone)s were measured by Size Exclusion Chromatography (SEC) using chloroform as the mobile phase and an ultraviolet (UV) detector at 254 nanometers. The columns used were Phenogel 5 μm linear 300×7.8 mm (2 columns arranged in series) columns at 30° C., available from Phenomenex. A flow rate of 1.0 mL/minute of the chloroform mobile phase was used. Polystyrene molecular weight standards were used for calibration. FIG. 2 shows a typical SEC chromatogram or GPC chromatograph of poly(phthalazinone ether sulfone)s of mV against elution volume (ml).

The glass transition temperature (Tg) of each polymer was measured by Differential Scanning calorimetry (DSC) using a TA Instruments Q-100 DSC machine with a heating rate of 20° C./minutes.

Melt flows as reported herein were measured using a Tinius Olsen plastometer operating at 385° C. The procedure is as follows: A sample of polymer was dried overnight in a vacuum oven at 150° C. A 6 gram sample of the dried polymer was added to the barrel (having an orifice of 0.0825 inches) of the plastometer with the die and die plug already in place. The piston was placed in the barrel, a 5.0 Kg weight placed on the piston, and a 7 minute heating period was started. About 5-10 seconds prior to the expiration of the 7 minute heating period the die plug was removed. At the expiration of the 7 minute heating period, extruded polymer "cuts" were taken every 10, 20 or 30 seconds. The time for the cut was selected to produce a cut 1 to 1.5 inches long. After cooling, each cut was weighed to the nearest 0.0001 grams. The melt flow (MF) was calculated as follows:

MF(g/10 minutes)={600/no. seconds per cut}×(average weight of cuts)

EXAMPLES

Experimental Examples

Preparation of Poly(Phthalazinone Ether Sulfone)

Example 1

To a dry 100 mL 3-neck round-bottomed flask equipped with a Dean Stark trap, a cold water condenser, mechanical stirrer, and a nitrogen inlet, 5.3605 grams (22.50 mmol) of phthalazinone monomer, 3.4205 grams (24.75 mmol) of ground anhydrous $K_2CO_3$, 7.9 mL (9.96 grams) of purified sulfolane, and 15 mL of xylene were added. The mixture was heated to 170° C. with an oil bath and maintained for 90 minutes. During this time, xylene was removed for dehydration. Then the mixture was cooled to 100° C., 6.4612 grams (22.50 mmol) of bis(4-chlorophenyl)sulfone and 5 mL of xylene were added. The mixture was re-heated to 215° C. and maintained for 5.5 hrs. During this time, xylene was removed with reflux and 14 mL (17.65 grams) of purified sulfolane was added dropwise over 5 hrs to keep the viscous solution stirring. At the end of the addition of sulfolane, the reaction was continued for another 30 minutes. At the end of the reaction, the viscous mixture was diluted by addition of 20 mL sulfolane, and was added to dropwise into hot water with vigorous stirring. The polymer was filtered and then washed three times with boiling water. It was then filtered, and dried in a vacuum oven at 90° C. overnight to give a white polymer.

The polymer was characterized and the results are summarized in Table 1.

Comparative Example 1

To a dry 100 mL 3-neck round-bottomed flask equipped with a Dean Stark trap, a cold water condenser, mechanical stirrer, and a nitrogen inlet, 5.3605 grams (22.50 mmol) of phthalazinone monomer, 3.4205 grams (24.75 mmol) of ground anhydrous $K_2CO_3$, 21.4 mL (27.0 grams) of purified sulfolane, and 15 mL of xylene were added. The mixture was heated to 170° C. with an oil bath and maintained for 90 minutes. During this time, xylene was removed by distillation. Then the mixture was cooled to 100° C., 6.4612 grams (22.50 mmol) of bis(4-chlorophenyl)sulfone and 5 mL of xylene were added. The mixture was re-heated to 215° C. and maintained for 5.5 hrs. During this time, xylene was removed with reflux. At end of reaction, the viscous mixture was diluted with addition of 20 mL sulfolane, and was added dropwise into hot water with vigorous stirring. The polymer was filtered and then washed three times with boiling water. It was then filtered, and dried in a vacuum oven at 90° C. overnight to give a white polymer. The polymer was characterized and the results are summarized in Table 1.

TABLE 1

Poly(phthalazinone ether sulfone) made at different solids contents

| Reaction | Example 1 | Comparative example 1 | Comparative sample[f] |
|---|---|---|---|
| Solid content, initial[a] | 54.3% | 30.5% | — |
| Solid content, final[b] | 30.0% | 30.5% | — |
| Cyclic oligomer 1 | 1.12% | 3.11% | 10.40% |
| Cyclic oligomer 2 | 1.03% | 2.10% | 2.00% |
| Cyclic oligomer 3 | 0.70% | 1.35% | 1.40% |
| Cyclic oligomers, total | 2.85% | 6.56% | 13.80% |
| Mw[c] | 96,500 | 98,800 | 126,300 |
| Mn[d] | 21,500 | 12,500 | 7,850 |
| Mw/Mn[e] | 4.5 | 7.9 | 16 |

[a]Percentage of solids at beginning of polycondensation reaction {(grams of two monomers)/(grams of two monomers + grams of sulfolane) × 100%}
[b]Percentage of solids at end of polycondensation reaction {(grams of two monomers)/(grams of two monomers + grams of sulfolane) × 100%}
[c]Weight average molecular weight
[d]Number average molecular weight
[e]Polydispersivity, i.e. Mw/Mn
[f]A commercial sample from Dalian Polymers New Materials Co. Ltd.

"Preparation of 4,4'-Biphenol-bis(4-chlorophenyl)sulfone-4-(4-hydroxyphenyl)-1 (2H)-phthalazinone copolymer hereinafter a copoly(phthalazinone ether sulfone) from 4,4'-biphenol and phthalazinone monomer".

Example 2

A copoly(phthalazinone ether sulfone) with 80/20 molar ratio of phthalazinone monomer and 4,4'-biphenol was prepared according to the following procedure.

To a dry 100 mL 3-neck round-bottomed flask equipped with a Dean Stark trap, a cold water condenser, mechanical stirrer, and a nitrogen inlet, 3.6690 grams (15.40 mmol) of phthalazinone monomer, 0.7169 grams (3.85 mmol) of 4,4'-biphenol, 2.9265 grams (21.18 mmol) of ground anhydrous $K_2CO_3$, 5.40 mL (6.80 grams) of purified sulfolane, and 15 mL of xylene were added. The mixture was heated to 170° C. with an oil bath and maintained for 90 minutes. During this time, xylene was removed for dehydration. Then the mixture was cooled to 100° C., 5.5379 grams (19.25 mmol) of bis(4-chlorophenyl)sulfone and 5 mL of xylene were added. The mixture was re-heated to 215° C. and maintained for 5.5 hrs. During this time, xylene was removed with reflux and 20 mL (17.65 grams) of purified sulfolane was added dropwise over 5 hrs to lower the solution viscosity so that the viscous solution could be stirred. At the end of addition of sulfolane, the reaction was continued for another 30 minutes. The viscous mixture was then diluted with the addition of 20 mL sulfolane, and was added to dropwise into hot water with vigorous stirring. The polymer was filtered and then washed three times with boiling water. It was then filtered, and dried in a vacuum oven at 90° C. overnight to give a white polymer. The polymer was characterized and the results are summarized in Table 2.

Example 3

A copoly(phthalazinone ether sulfone) with 70/30 molar ratio of phthalazinone monomer and 4,4'-biphenol was prepared similarly according the procedure described in Example 2. The polymer was characterized and the results are summarized in Table 2.

Example 4

A copoly(phthalazinone ether sulfone) with 60/40 molar ratio of phthalazinone monomer and 4,4'-biphenol was prepared similarly according the procedure described in Example 2. The polymer was characterized and the results are summarized in Table 2.

Example 5

A copoly(phthalazinone ether sulfone) with 50/50 molar ratio of phthalazinone monomer and 4,4'-biphenol was prepared similarly according the procedure described in Example 2. The polymer was characterized and the results are summarized in Table 2.

Example 6

A copoly(phthalazinone ether sulfone) with 40/60 molar ratio of phthalazinone monomer and 4,4'-biphenol was prepared similarly according the procedure described in Example 2. The polymer was characterized and the results are summarized in Table 2.

TABLE 2

Copoly(phthalazinone ether sulfone) with different molar ratio of phthalazinone monomer and 4,4'-biphenol

| Reaction | Example 2 | Example 3 | Example 4 | Example 5 | Example 6 |
|---|---|---|---|---|---|
| Molar ratio of phthalazinone and 4,4'-biphenol | 80/20 | 70/30 | 60/40 | 50/50 | 40/60 |
| Solid content, initial[a] | 63.1% | 62.2% | 65.6% | 69.3% | 67.3% |
| Solid content, final[b] | 21.0% | 22.6% | 25.2% | 28.6% | 31.0% |
| Cyclic oligomer 1 | 1.22% | 1.03% | 0.63% | 0.46% | 0.37% |
| Cyclic oligomer 2 | 1.10% | 0.88% | 0.75% | 0.59% | 0.57% |
| Cyclic oligomer 3 | 0.73% | 0.55% | 0.51% | 0.41% | 0.40% |
| Cyclic oligomers, total | 3.05% | 2.46% | 1.89% | 1.46% | 1.34% |
| $Mw^{c}$ | 169,600 | 149,800 | 160,300 | 112,500 | 120,500 |
| $Mn^{d}$ | 30,500 | 28,500 | 33,500 | 30,000 | 30,500 |
| $Mw/Mn^{e}$ | 5.6 | 5.3 | 4.8 | 3.7 | 3.9 |
| $Tg\ (°C.)^{f}$ | 292 | 286 | 279 | 269 | 263 |
| Inherent viscosity at concentration of 0.5 g/dL in NMP at 25° C. | 1.26 | 1.25 | 1.59 | 0.91 | 1.17 |

[a] Percentage of solids at beginning of polycondensation reaction {(grams of two monomers)/(grams of two monomers + grams of sulfolane) × 100%}
[b] Percentage of solids at end of polycondensation reaction {(grams of two monomers)/(grams of two monomers + grams of sulfolane) × 100%}
[c] Weight average molecular weight
[d] Number average molecular weight
[e] Polydispersivity, i.e. Mw/Mn
[f] Glass transition temperature measured by DSC with a heating rate of 20° C./minute Preparation of Copoly(Aryl Ether Sulfone) of 60/40 Phthalazinone/Biphenol with Different Mw Copoly(phthalazinone ether sulfone) with 60/40 molar ratio of phthalazinone monomer and 4,4'-biphenol was prepared according the following procedure using excess of bis (4-chlorophenyl)sulfone to control the Mw of polymer. An end-capping agent such as methyl chloride can also be employed to end-capping any terminal NH groups in the resulting polymer.

Example 7

To a dry 100 mL 3-neck round-bottomed flask equipped with a Dean Stark trap, a cold water condenser, mechanical stirrer, and a nitrogen inlet, 3.6690 grams (15.40 mmol) of phthalazinone monomer, 1.9118 grams (10.27 mmol) of 4,4'-biphenol, 2.9265 grams (21.18 mmol) of ground anhydrous $K_2CO_3$, 5.40 mL (6.80 grams) of purified sulfolane, and 15 mL of xylene were added. The mixture was heated to 170° C. with an oil bath and maintained for 90 minutes. During this time, xylene was removed for dehydration. Then the mixture was cooled to 100° C., 7.4443 grams (25.92 mmol) of bis(4-chlorophenyl)sulfone and 5 mL of xylene were added. The mixture was re-heated to 215° C. and maintained for 5.5 hrs. During this time, xylene was slowly removed by distillation and 12 mL (17.65 grams) of purified sulfolane was added dropwise over 5 hrs to lower the solution viscosity to keep the viscous solution stirring. At end of addition of sulfolane, the reaction was continued for another 30 minutes. At the end of the reaction, the viscous mixture was diluted with addition of 20 mL of sulfolane, and was added to dropwise into hot water with vigorous stirring. The polymer was filtered and then washed three times with boiling water. It was then filtered, and dried in a vacuum oven at 90° C. overnight to give a white polymer. The polymer was characterized and the results are summarized in Table 3.

Example 8-11

Copoly(phthalazinone ether sulfone)s with 60/40 molar ratio of phthalazinone monomer and 4,4'-biphenol was prepared similarly according the procedure described in Example 7. The polymer was characterized and the results are summarized in Table 3.

TABLE 3

Copoly(phthalazinone ether sulfone) with 60/40 molar ratio of phthalazinone and 4,4'-biphenol

| Reaction | Example 7 | Example 8 | Example 9 | Example 10 | Example 11 |
|---|---|---|---|---|---|
| Molar excess of bis(4-chlorophenyl)sulfone | 1.0% | 1.7% | 2.0% | 2.1% | 2.5% |
| Solid content, initial[a] | 65.7% | 65.8% | 65.8% | 68.0% | 65.9% |
| Solid content, final[b] | 37.2% | 29.0% | 37.4% | 29.5% | 37.5% |
| Cyclic oligomer 1 | 0.18% | 0.55% | 0.30% | 0.50% | 0.45% |
| Cyclic oligomer 2 | 0.31% | 0.70% | 0.49% | 0.65% | 0.49% |

TABLE 3-continued

Copoly(phthalazinone ether sulfone) with 60/40 molar ratio of phthalazinone and 4,4'-biphenol

| Reaction | Example 7 | Example 8 | Example 9 | Example 10 | Example 11 |
|---|---|---|---|---|---|
| Cyclic oligomer 3 | 0.21% | 0.43% | 0.27% | 0.38% | 0.30% |
| Cyclic oligomers, total | 0.70% | 1.68% | 1.06% | 1.53% | 1.24% |
| Mw[c] | 80,000 | 51,300 | 47,300 | 49,300 | 28,600 |
| Mn[d] | 31,500 | 18,500 | 20,100 | 17,600 | 13,000 |
| Mw/Mn[e] | 2.50 | 2.77 | 2.35 | 2.80 | 2.20 |
| Tg (° C.)[f] | 273 | 265 | 265 | 263 | 255 |

[a] Percentage of solids at beginning of polycondensation reaction {(grams of two monomers)/(grams of two monomers + grams of sulfolane) × 100%}
[b] Percentage of solids at end of polycondensation reaction {(grams of two monomers)/(grams of two monomers + grams of sulfolane) × 100%}
[c] Weight average molecular weight
[d] Number average molecular weight
[e] Polydispersivity, i.e. Mw/Mn
[f] Glass transition temperature measured by DSC with a heating rate of 20° C./minute Example 12

A larger amount (>100 grams) of copoly(phthalazinone ether sulfone)s with 60/40 molar ratio of phthalazinone monomer and 4,4'-biphenol was prepared similarly according to the procedure described in Example 7. The polymer was characterized and the results are summarized in Table 4.

TABLE 4

Properties of copoly(aryl ether sulfone of phthalazinone and 4,4'-biphenol with molar ratio of 60/40

| Reaction | Example 12 |
|---|---|
| Molar excess of bis(4-chlorophenyl)sulfone | 1.0% |
| Solid content, initial[a] | 65.7% |
| Solid content, final[b] | 47.7% |
| Cyclic oligomer 1 | 0.39% |
| Cyclic oligomer 2 | 0.56% |
| Cyclic oligomer 3 | 0.36% |
| Cyclic oligomers, total | 1.31% |
| Mw[c] | 53,000 |
| Mn[d] | 20,000 |
| Mw/Mn[e] | 2.65 |
| Tg (° C.)[f] | 265 |
| Melt flow rate at 385° C./5.0 Kg | 12 g/ 10 minutes |

[a] Percentage of solids at beginning of polycondensation reaction {(grams of two monomers)/(grams of two monomers + grams of sulfolane) × 100%}
[b] Percentage of solids at end of polycondensation reaction {(grams of two monomers)/(grams of two monomers + grams of sulfolane) × 100%}
[c] Weight average molecular weight
[d] Number average molecular weight
[e] Polydispersivity, i.e. Mw/Mn
[f] Glass transition temperature measured by DSC with a heating rate of 20° C./minute References 1. Berard, N. and A. S. Hay. *Polymers from Hydroxyphenylphthalazinones*. in *Polym. Prepr. (Am. Chem. Soc., Div. Pol. Chem.)* 1993.
2. Berard, N., et al., *Polymers from 4-(4-Hydroxyphenyl)phthalazin-1-one*. Makromolekulare Chemie, Macromol. Symp., 1994. 77: p. 379-88.
3. Meng, Y., et al., *Study on the thereto-oxidizing stability of poly(aryl ether ketone) containing phthalazone moiety*. Gaofenzi Cailiao Kexue Yu Gongcheng, 1994. 10(6): p. 85-8.
4. Meng, Y., et al., *Synthesis and Testing of a New Poly(ether ketone)*. Gaofenzi Caillo Kexue Yu Gongchen (CA 121, 301481s), 1994. 10(20): p. 22-5.
5. Paventi, M., K. P. Chan, and A. S. Hay, *Spectroscopic And Magnetic Resonance Elucidation Of The Structure Of The Polymer Derived From 1,2-dihydro-4-(4-hydroxyphenyl)-1-oxo-(2h)-phthalazine and Bis(4-fluorophenyl)sulfone*. J. Macromol. Sci., 1996. A32: p. 133-56.
6. Meng, Y. Z., et al., *Synthesis of Novel Poly(phthalazinone ether sulfone ketone)s and improvement of its Melt Flow Properties*. J. Appl. Pol. Sci., 1997. 66: p. 1425-33.
7. Meng, Y. Z., et al., *Synthesis and Properties of Poly(aryl ether sulfone)s Containing the Phthalazinone Moiety*. J. Appl. Pol. Sci., 1998. 68: p. 137-45.
8. Meng, Y. Z., S. C. Tjong, and A. S. Hay, *Morphology, rheological and thermal properties of the melt blends of poly(phthalazinone ether ketone sulfone) with liquid crystalline copolyester*. Polymer, 1998. 39: p. 1845-61.
9. Meng, Y. Z., A. R. Hlil, and A. S. Hay, *Synthesis and Thermal Properties of Poly(arylene ether ketone)s Containing Phthalazinone Moieties*. J. Pol. Sci. Chem., 1999. 37: p. 1781-8.

The invention claimed is:

1. A melt processable copoly(phthalazinone ether sulfone) composition of formula 1, consisting essentially of:

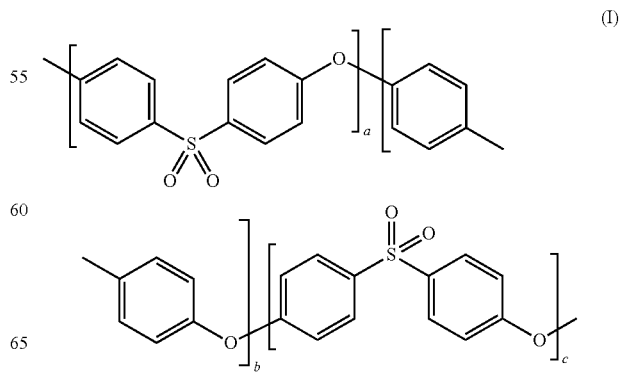

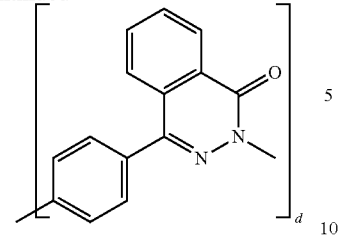

wherein a, b, c, and d represent mole fractions of the monomers present in the copolymer, wherein each are independently from 0.1 to 1, wherein a=b, c=d, a+c is 0.5, b is at least 0.1, d is at least 0.2, and a+b+c+d=1.0, wherein the copoly(phthalazinone ether sulfone) composition has a weight average molecular weight of about 20,000 to about 170,000, a polydispersivity less than 6, and a glass transition temperature (Tq) less than or equal to 292° C., resulting in the copoly(phthalazinone ether sulfone) composition being melt processable.

2. The copoly(phthalazinone ether sulfone) composition of claim 1, wherein b is between about 0.2 and about 0.3, and d is between about 0.2 to about 0.3.

3. The copoly(phthalazinone ether sulfone) composition of claim 1, wherein b=0.1 and d=0.4.

4. The copoly(phthalazinone ether sulfone) composition of claim 1, wherein b=0.15 and d=0.35.

5. The copoly(phthalazinone ether sulfone) composition of claim 1, wherein b=0.2 and d=0.3.

6. The copoly(phthalazinone ether sulfone) composition of claim 5, wherein a melt flow rate at 385° C./5.0 Kg is about 12 (+/−) 0.24 g/10 minutes.

7. The copoly(phthalazinone ether sulfone) composition of claim 1, wherein b=0.25 and d=0.25.

8. The copoly(phthalazinone ether sulfone) composition of claim 1, wherein b=0.3 and d=0.2.

9. The copoly(phthalazinone ether sulfone) composition of claim 1, wherein the composition has less than 5%, by weight, of low molecular weight oligomers.

10. The copoly(phthalazinone ether sulfone) composition of claim 1, wherein the weight average molecular weight is between about 30,000 and 90,000.

11. An article molded of the copoly(phthalazinone ether sulfone) composition of claim 1.

12. A process for preparing a melt processable copoly (phthalazinone ether sulfone) composition represented by formula (I), comprising:

providing a reaction mixture that includes monomers incorporated in the copoly(phthalazinone ether sulfone) composition, wherein the monomers consist essentially of:
a molar excess in excess of the stoichiometric mole fractions "a" and "c" of a dihalogenodiphenyl sulphone represented by formula (V);

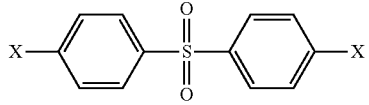

wherein each X=Cl, or each X=F;
a stoichiometric mole fraction "d" of 4(4-hydroxyphenyl)-1(2H) phthalazinone; and
a stoichiometric mole fraction "b" of 4,4'-biphenol,
wherein a, b, c, and d represent mole fractions of the monomers incorporated in the copolymer,
wherein each are independently from 0.1 to 1, wherein a=b, c=d, a+c is 0.5, b is at least 0.1, d is at least 0.2, and a+b+c+d =1,
wherein the copoly(phthalazinone ether sulfone) composition has a weight average molecular weight of about 20,000 to about 170,000, a polydispersivity less than 6, and a glass transition temperature (Tg) less than or equal to 292° C., resulting in the copoly(phthalazinone ether sulfone) composition being melt processable; and
polymerizing the monomers in the presence of a solvent and an alkali metal or alkaline earth metal carbonate or bicarbonate, at an elevated temperature, while maintaining said reaction medium substantially anhydrous by removal of water generated in the polymerization.

13. The method of claim 12, wherein the composition has less than 5%, by weight, of low molecular weight oligomers.

14. The method of claim 12, wherein the weight average molecular weight of the composition is between about 20,000 and 170,000.

15. The method of claim 12, wherein the weight average molecular weight of the composition is between about 30,000 and 90,000.

16. The method of claim 12, wherein a melt flow rate of the composition at 385° C./5.0 Kg is about 12 (+/−) 0.24 g/10 minutes.

17. The method of claim 12, wherein said elevated temperature is 140 to 280° C.

18. The method of claim 12, wherein said elevated temperature is 170 to 220° C.

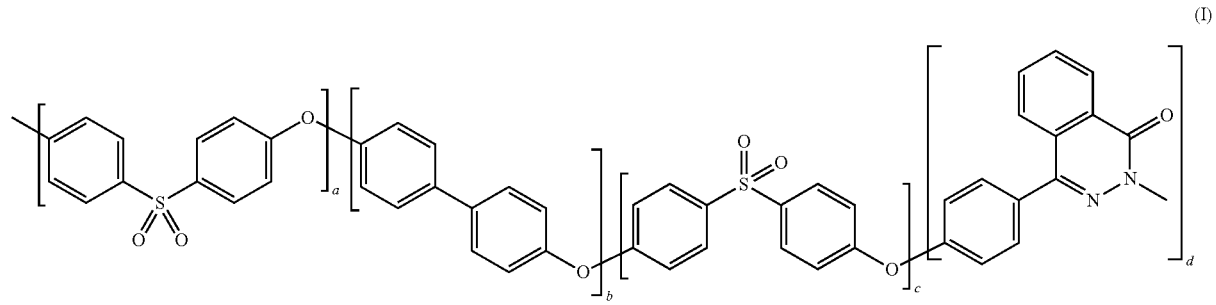

19. The method of claim 12, wherein said solvent is an azeotrope-forming solvent, which forms an azeotrope with water formed in the reaction, and the water is removed from the reaction medium by distillation of the azeotrope, and the volume of the reaction medium is maintained by continuously adding a polar aprotic solvent, whereby the formed copoly(phthalazinone ether sulfone) composition is dissolved in the polar aprotic solvent, and any remaining non-distilled azeotrope-forming solvent.

20. The method of claim 19, wherein an initial solids content of the reaction mixture is greater than 60 percent by weight.

* * * * *